United States Patent [19]

Sato et al.

[11] 4,420,058

[45] Dec. 13, 1983

[54] RADIATOR GUARD STRUCTURE FOR VEHICLES

[75] Inventors: Yoshito Sato, Hirakata; Kazukiyo Chiba; Minoru Matsumoto, both of Katano, all of Japan

[73] Assignee: Kabushiki Kaisha Komatsu Seisakusho, Tokyo, Japan

[21] Appl. No.: 276,083

[22] Filed: Jun. 22, 1981

[30] Foreign Application Priority Data

Jun. 25, 1980 [JP] Japan .............................. 55-88141[U]

[51] Int. Cl.³ .......................................... B60K 11/04
[52] U.S. Cl. .................................... 180/68 P; 49/465
[58] Field of Search .............. 180/68.6, 68.4, 68 R, 180/68 P; 49/463, 465; 296/191, 196; 414/685, 697

[56] References Cited

U.S. PATENT DOCUMENTS

| 2,468,809 | 5/1949 | Brock et al. | 180/68.6 X |
| 2,965,187 | 12/1960 | Zeman | 180/68.6 X |
| 3,834,478 | 9/1974 | Alexander et al. | 180/68.6 |
| 4,092,074 | 5/1978 | Harper et al. | 403/24 |
| 4,099,511 | 7/1978 | McIntire et al. | 49/465 X |
| 4,106,236 | 8/1978 | Oliphant | 49/465 X |

Primary Examiner—Joseph F. Peters, Jr.
Assistant Examiner—Michael Mar
Attorney, Agent, or Firm—Armstrong, Nikaido, Marmelstein & Kubovcik

[57] ABSTRACT

A radiator guard structure for a vehicle comprising a pair of lift cylinder supports secured to a frame of the vehicle, a pair of hooks secured to the frame, and a radiator cover detachably mounted to the frame for guarding a radiator.

The radiator cover has formed or mounted thereto a pair of pins each being engageable with the respective hooks and a pair of mounting seat structures. A resilient mounting is provided between each of said mounting seat structures and each of said lift cylinder supports.

4 Claims, 5 Drawing Figures

RADIATOR GUARD STRUCTURE FOR VEHICLES

BACKGROUND OF THE INVENTION

This invention relates to a radiator guard structure for use in construction vehicles such as bulldozers, etc.

The radiator guard structure of conventional type is arranged to be fitted to the main frame by tightening up bolts on both sides thereof, and therefore a strain will occur in the radiator guard. Further, because the radiator guard is rigidly mounted on the main frame, a disadvantage exists in that the strain of the main frame has to be taken up by the guard itself. Besides, in the radiator guard of conventional type, because the lift cylinders of the implement are mounted on the radiator guard, if a strain occurs in the mounting portions by the action of the hydraulic pressure applied thereto, it is necessary to absorb the strain by the radiator guard. Therefore, such troubles as fractures of bolts which mount the radiator guard to the main frame have frequently occurred.

SUMMARY OF THE INVENTION

It is therefore an object of the present invention to provide a radiator guard structure for a construction vehicle which has overcome the above noted problems of the prior art.

Another object of the present invention is to provide a radiator guard structure for a construction vehicle wherein durability of the radiator guard is improved significantly by avoiding a possible development of strains in the radiator guard due to external forces.

In accordance with an aspect of the present invention, there is provided a radiator guard structure for a vehicle including an implement and a pair of lift cylinders for the implement, comprising: a frame of the vehicle; a pair of lift cylinder supports each for supporting the respective lift cylinders and being fixedly mounted to said frame at an upper end portion thereof; a pair of hook means each being fixedly mounted to said frame; a radiator cover detachably mounted to said frame; a pair of engaging means each being fixedly mounted to said radiator cover at a lower end portion thereof, each said engaging means being adapted to engage with said respective hook means; a pair of mounting seat structures each being provided at an upper end portion of said radiator cover; and a pair of resilient mounting means each for mounting said respective mounting seat structures of said radiator cover to said respective lift cylinder supports.

The above and other objects, features and advantages of the present invention will be readily apparent from the following description taken in conjunction with the accompanying drawings.

DESCRIPTION OF THE PREFERRED EMBODIMENT

Figure 1:
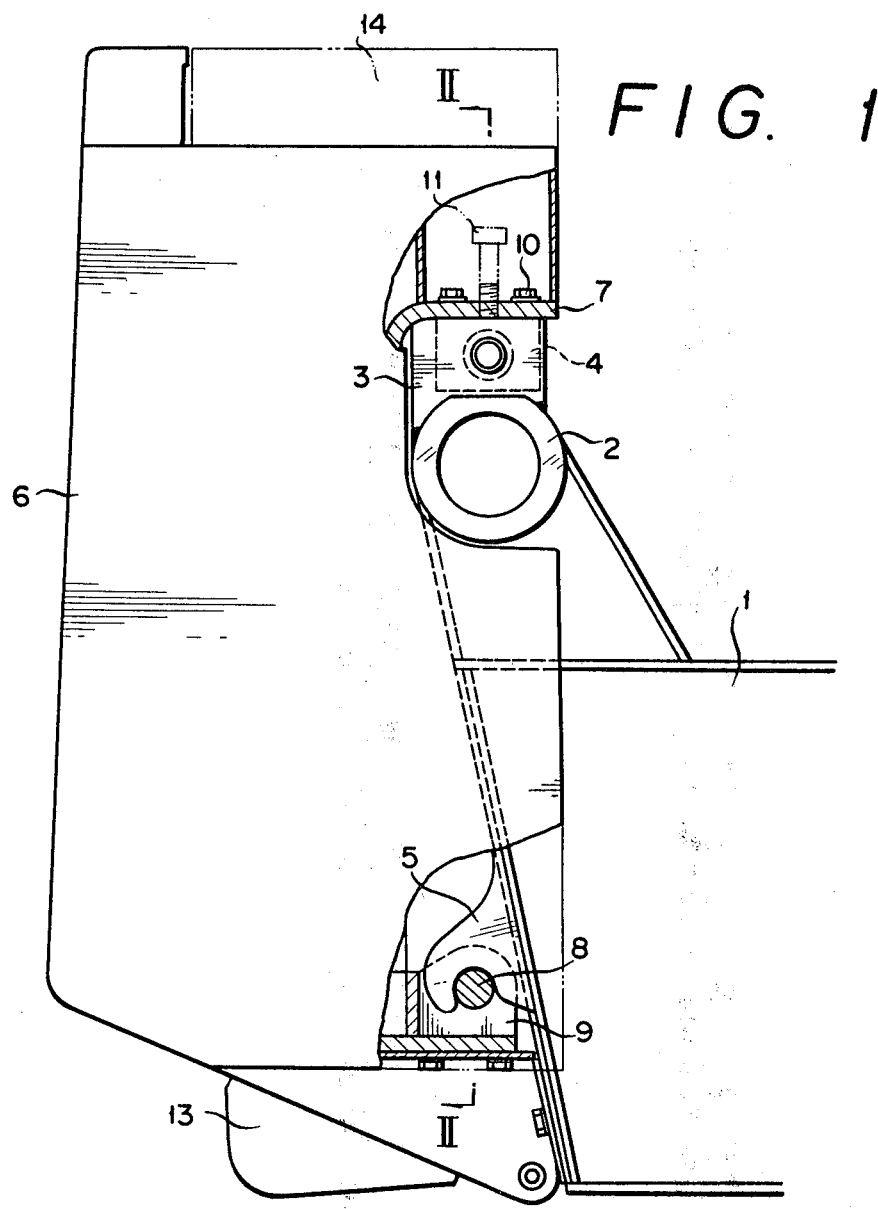
FIG. 1 is a side elevational view of a radiator guard of the present invention with parts cut-away.
Figure 2:
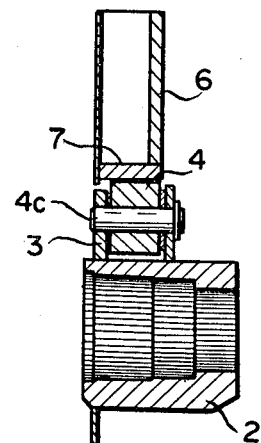
FIG. 2 is a cross-sectional view taken along the line II—II of FIG. 1.
Figure 3:
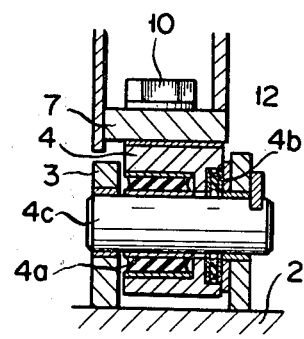
FIG. 3 is an enlarged cross-sectional view of an upper mounting portion of FIG. 2.
Figure 3:
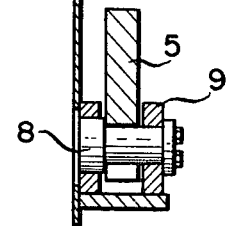
Figure 4:
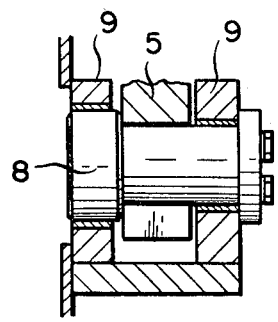
FIG. 4 is an enlarged cross-sectional view of a lower mounting portion of FIG. 2.
Figure 5:
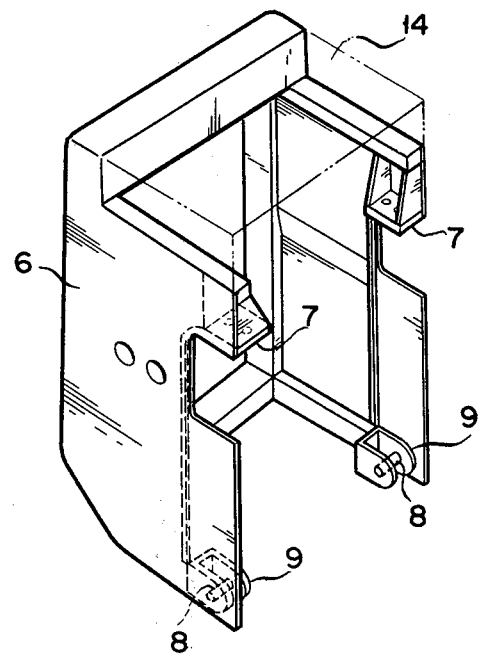
FIG. 5 is a perspective view of an embodiment of the present invention.

The present invention will now be described in detail below by way of example only with reference to the accompanying drawings.

Reference numeral 1 denotes a main frame. Fixedly secured to the upper part of the leading end of the main frame 1 on both sides thereof are lift cylinder supports 2. Further, fixedly secured to the upper surface of each of the lift cylinder supports 2 are brackets 3. A resilient mounting support 4 is connected by means of a pin 4c to the brackets 3. Mounted on the resilient mounting support 4 are an annular resilient member 4a which is vertically resiliently deformable and a washer-shaped resilient member 4b which is transversely resiliently deformable. Fixedly secured to the lower part of the leading end of the main frame 1 on both sides thereof are downwardly directed hooks 5. Reference numeral 6 denotes a radiator guard which has mounting seat structures 7 formed in the upper end portions of the rear end of both sides thereof, the mounting seat structures 7 being adapted to be fixedly secured onto the above-mentioned resilient mounting supports 4. Further, on both sides of the lower part of the rear end of the radiator guard 6, a pair of pins 8 which are detachably engageable with the hooks 5 are supported by brackets 9.

Thus, the radiator guard 6 can be mounted on the main frame 1 by engaging the pins 8 with the respective hooks 5 of the main frame 1 and then connecting the mounting seat structures 7 to the respective resilient mounting supports 4 by means of bolts 10. In this case, a retainer bolt 11 is screwed in to push down each resilient mounting support 4 allowing a shim 12 to be inserted between the mounting seat structure 7 and the resilient mounting support 4. It is to be noted that no pressure is applied to the washer-shaped resilient member 4b of the resilient mounting support 4. The hooks 5 should be engaged with the pins 8 so as not to cause any lateral idle play therebetween.

In the above-mentioned arrangement, the lift cylinders are supported by lift cylinder supports 2 mounted on the main frame 1. Further, an undercover 13 is fitted to the lower part of the radiator guard 6, whilst a radiator cover 14 is fitted to the upper part thereof so as to enhance the rigidity of the guard itself and also protect the equipments such as radiator, oil cooler and fan, etc. from subjecting external forces. The above-mentioned undercover 13 is fixedly secured to the main frame 1 and the radiator guard 6 by means of bolts, but the undercover is adapted to be rotatably supported relative to the main frame 1 when the bolts are removed therefrom.

As mentioned hereinabove, the present invention comprises lift cylinder supports 2, brackets 3, the supports 2 and the brackets 3 being both mounted on the upper part of the leading end of the main frame 1 on both sides thereof, hooks 5 fixedly secured to the lower part of the main frame 1 on both sides thereof, mounting seat structures 7 formed in the upper part of the rear end of the radiator guard 6 on both sides thereof, and a pair of pins 8 supported by means of brackets 9 formed in the lower part of the radiator guard 6 on both sides thereof, wherein the radiator guard 6 is adapted to be mounted on the main frame 1 by engaging the pins 8 with hooks 5 and connecting the mounting seat structures 7 with the brackets 3 through the resilient mounting support 4. Therefore, it is possible to prevent the strain of the main frame 1 to be transmitted to the radiator guard 6. Consequently, no strain due to external forces generates in the radiator guard, and so the reliability of the equipments mounted on the vehicle such as radiator guards, radiators, oil coolers and fans, etc. can be enhanced. Further, because there are clearances in the fitting portions of the radiator guard, there is no need of manufacturing the component parts with a high accuracy thereby enabling them to be manufactured more easily. Besides, since the lift cylinders are mounted on the main frame 1, the rigidity of the radiator guard 6 can be reduced and therefore weight reduction of the guard can be achieved.

It is to be understood that the foregoing description is merely illustrative of a preferred embodiment of the present invention, and that the scope of the invention is not limited thereto, but is to be determined by the scope of the appended claims.

What we claim is:

1. A radiator guard structure for a vehicle including an implement and a pair of lift cylinders for the implement, comprising:
   a frame of the vehicle;
   a pair of lift cylinder supports each for supporting the respective lift cylinders and being fixedly mounted to said frame at an upper end portion thereof;
   a pair of hook means each being fixedly mounted to said frame;
   a radiator cover detachably mounted to said frame;
   a pair of engaging means each being fixedly mounted to said radiator cover at a lower end portion thereof, each said engaging means being adapted to engage with said respective hook means;
   a pair of mounting seat structures each being provided at an upper end portion of said radiator cover; and
   a pair of resilient mounting means each for mounting said respective mounting seat structures of said radiator cover to said respective lift cylinder supports.

2. A radiator guard structure for a vehicle as recited in claim 1 wherein each of said engaging means comprises a pin.

3. A radiator guard structure for a vehicle as recited in claim 1 wherein each of said resilient mounting means comprises a pair of brackets fixedly secured to said respective lift cylinder supports with a spaced apart relationship from each other, each bracket having a hole formed therein, a support block member having a laterally oriented resilient member and a vertically oriented resilient member formed therein, said support block member having a bore hole formed therein, a pin insertable in the holes of said brackets and the bore hole of said support block member for coupling said support block member with said brackets, and bolt means for securing said support block member to said radiator cover.

4. A radiator guard structure for a vehicle as recited in claim 3 further comprising a shim inserted between said radiator cover and said respective support block members.

* * * * *